April 2, 1935.  A. E. DRISSNER  1,996,368
AUTOMATIC MULTIPLE SPINDLE MACHINE
Filed Jan. 26, 1933   15 Sheets-Sheet 4
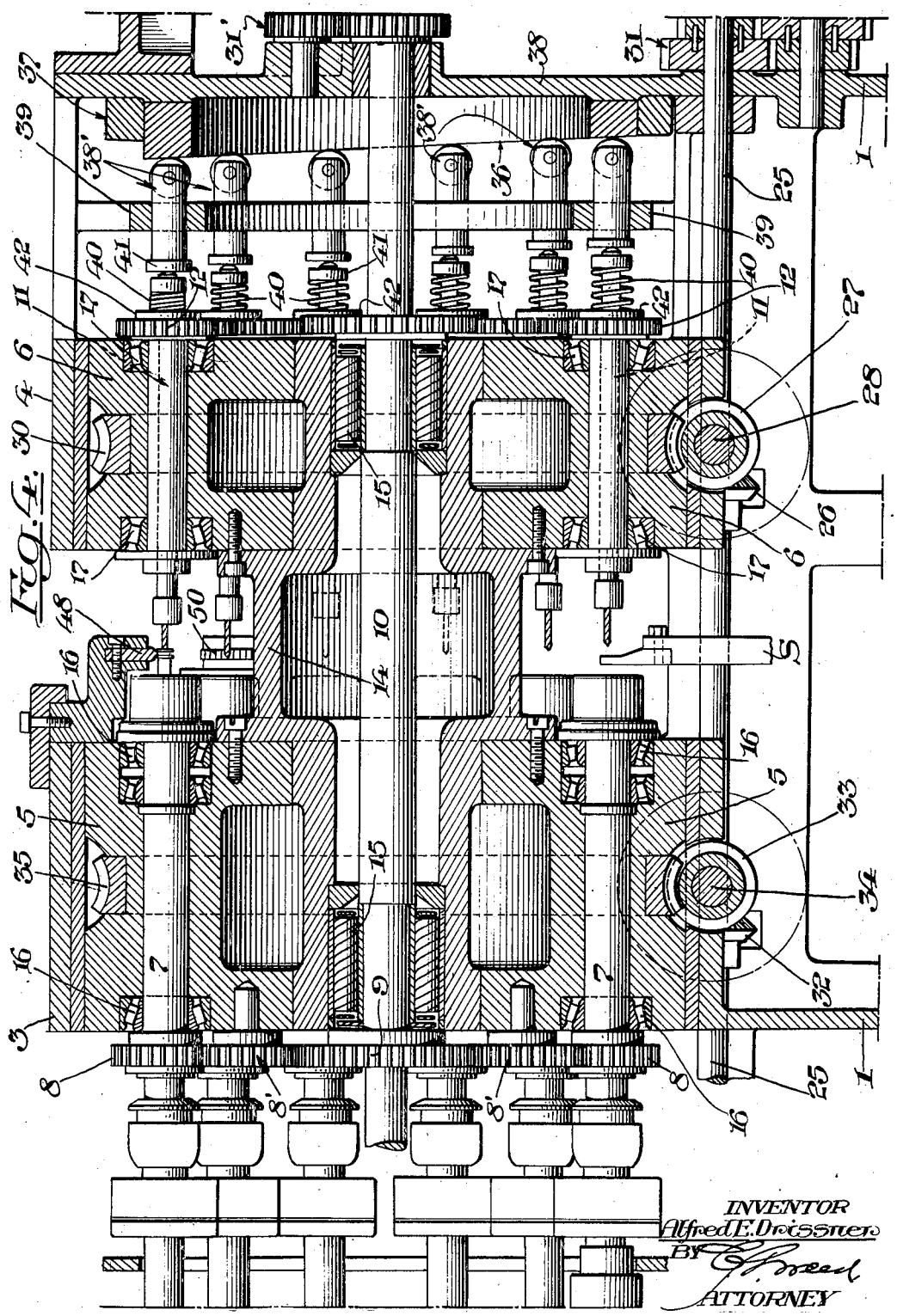
INVENTOR
Alfred E. Drissner
BY
ATTORNEY

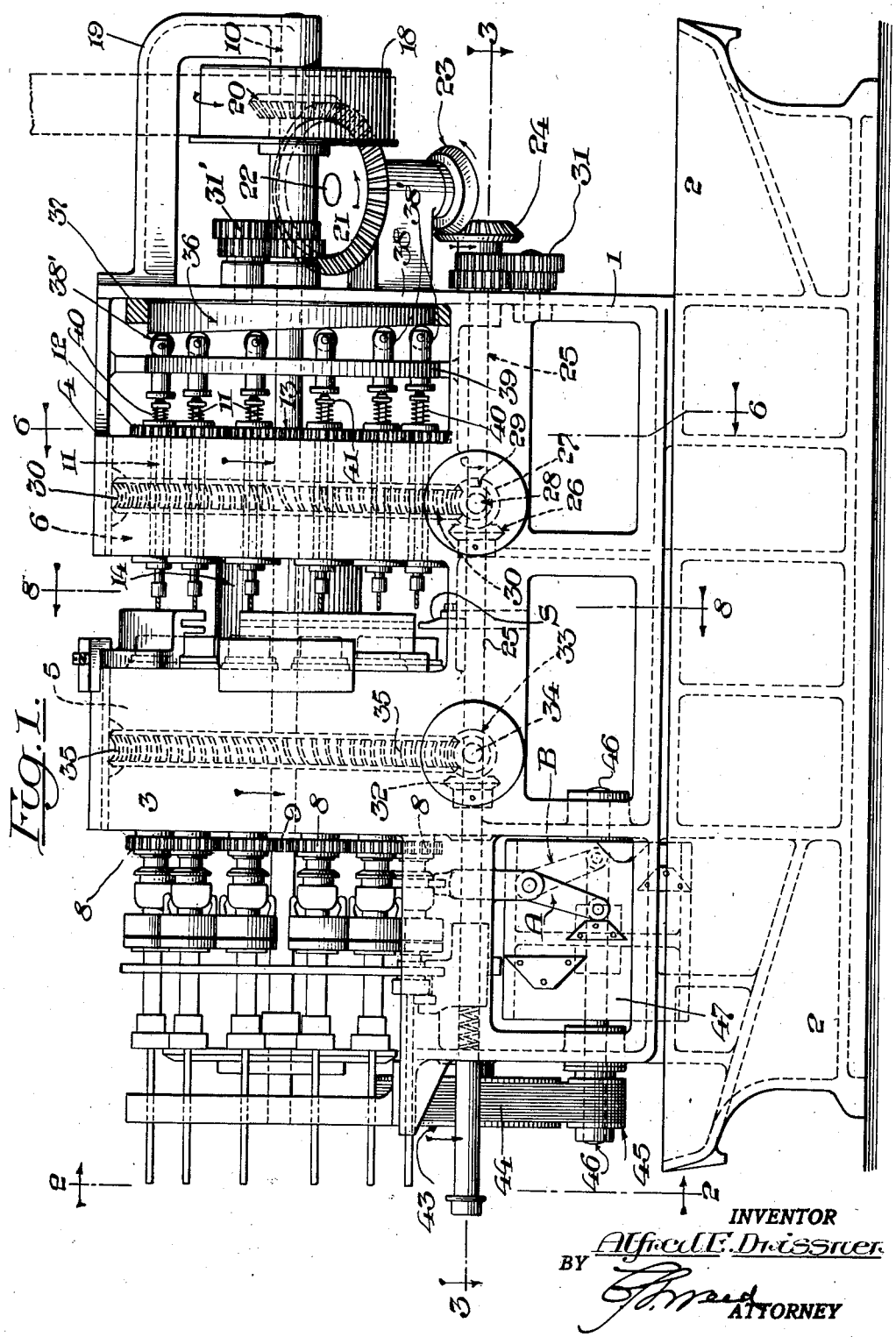

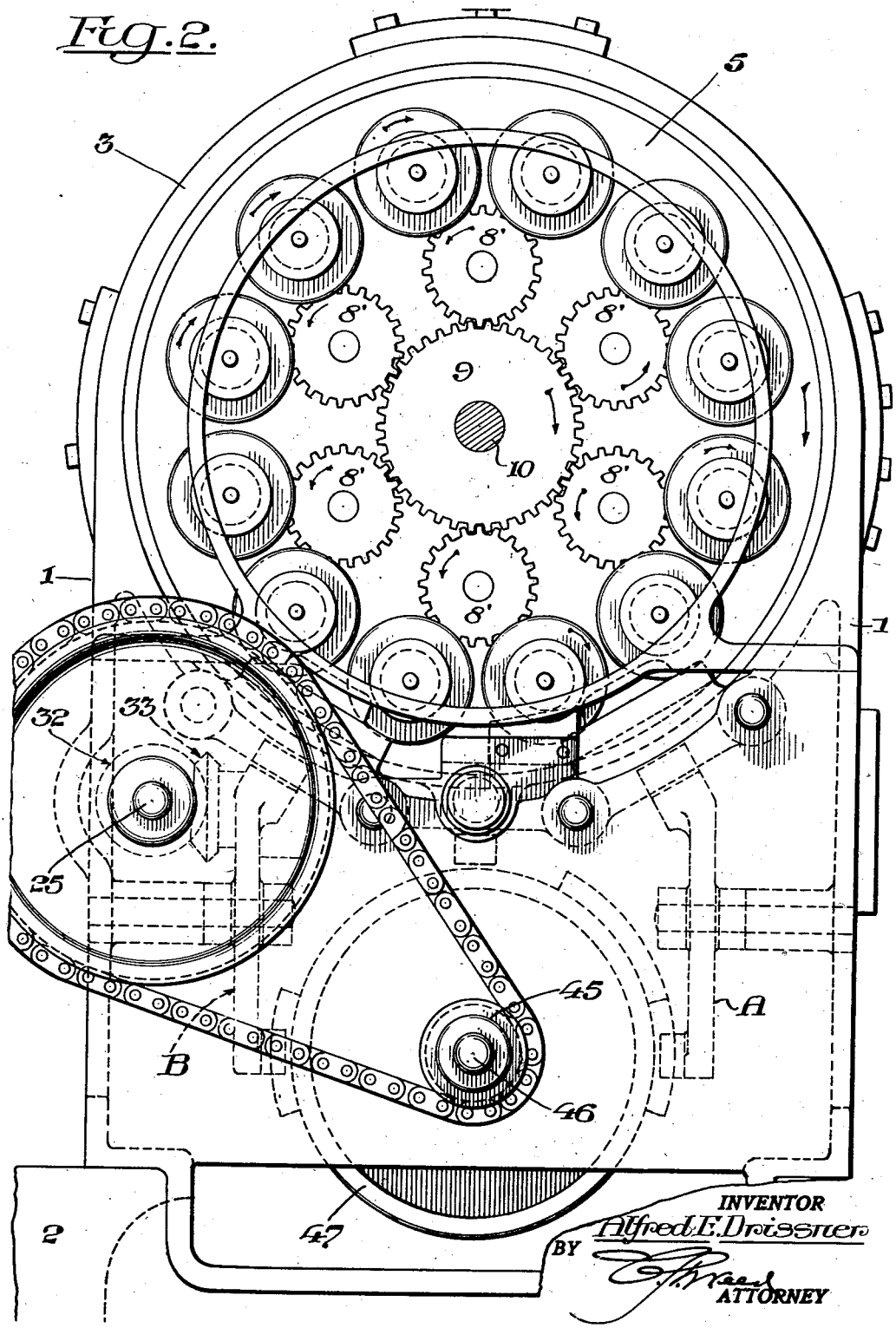

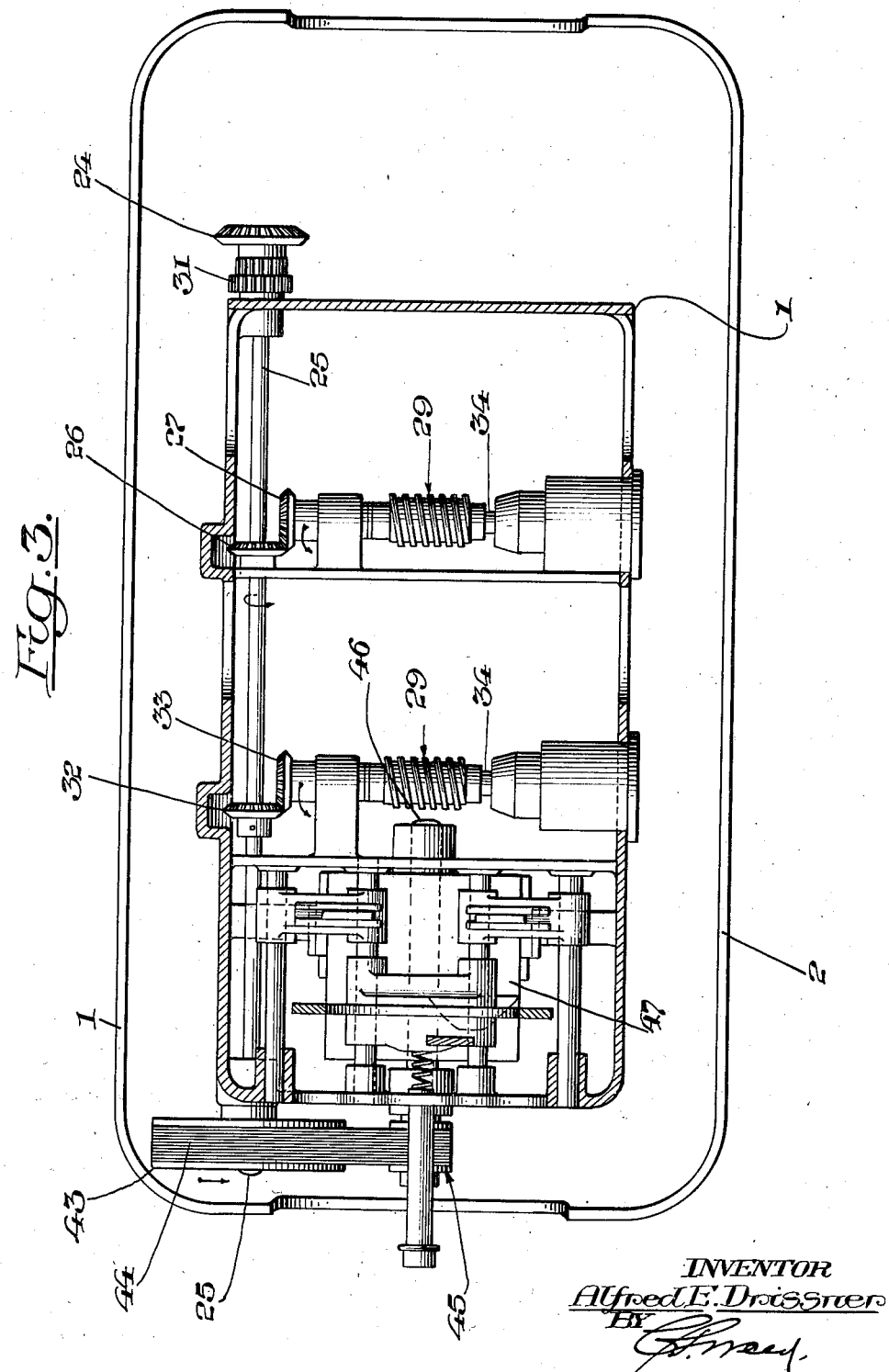

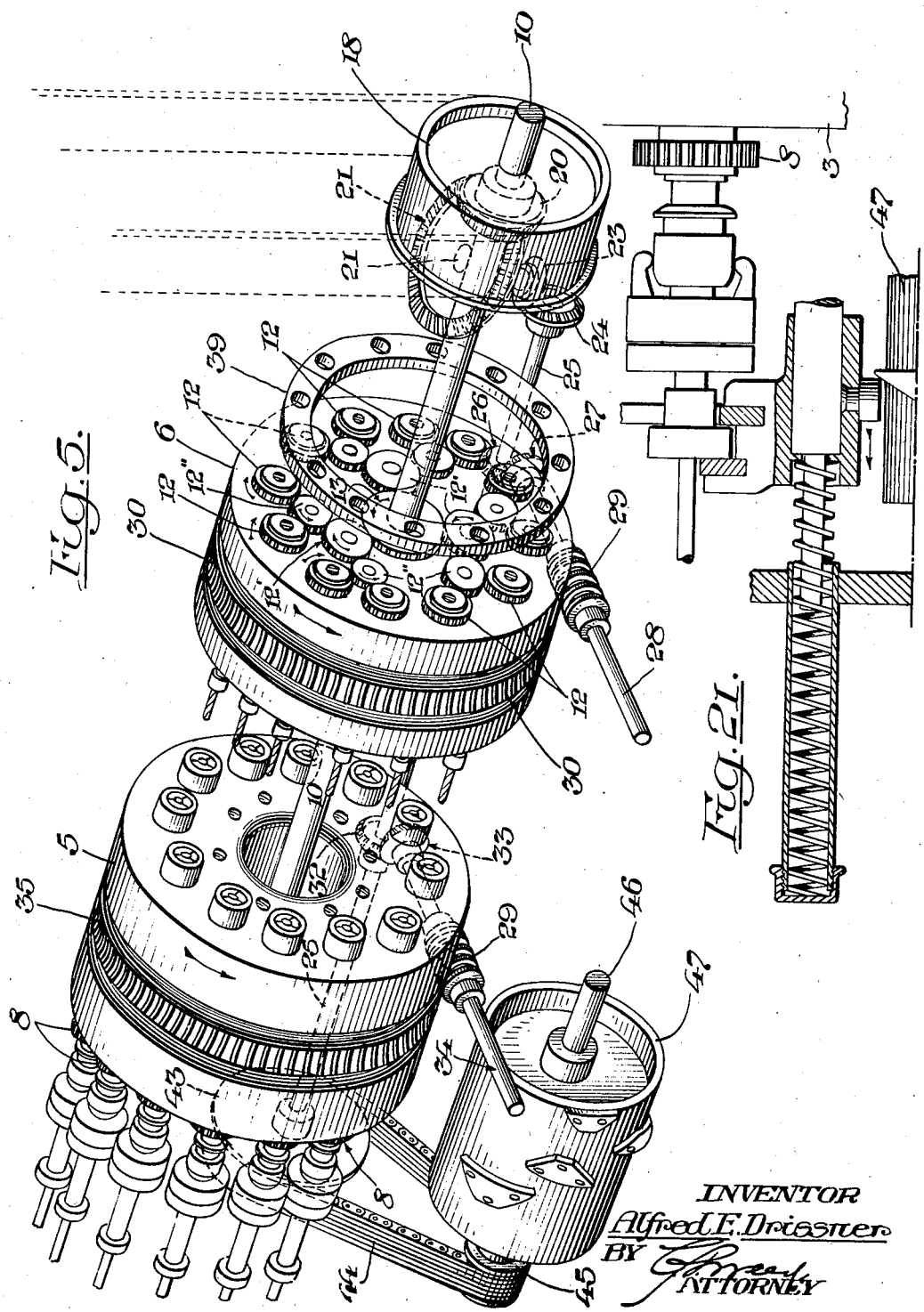

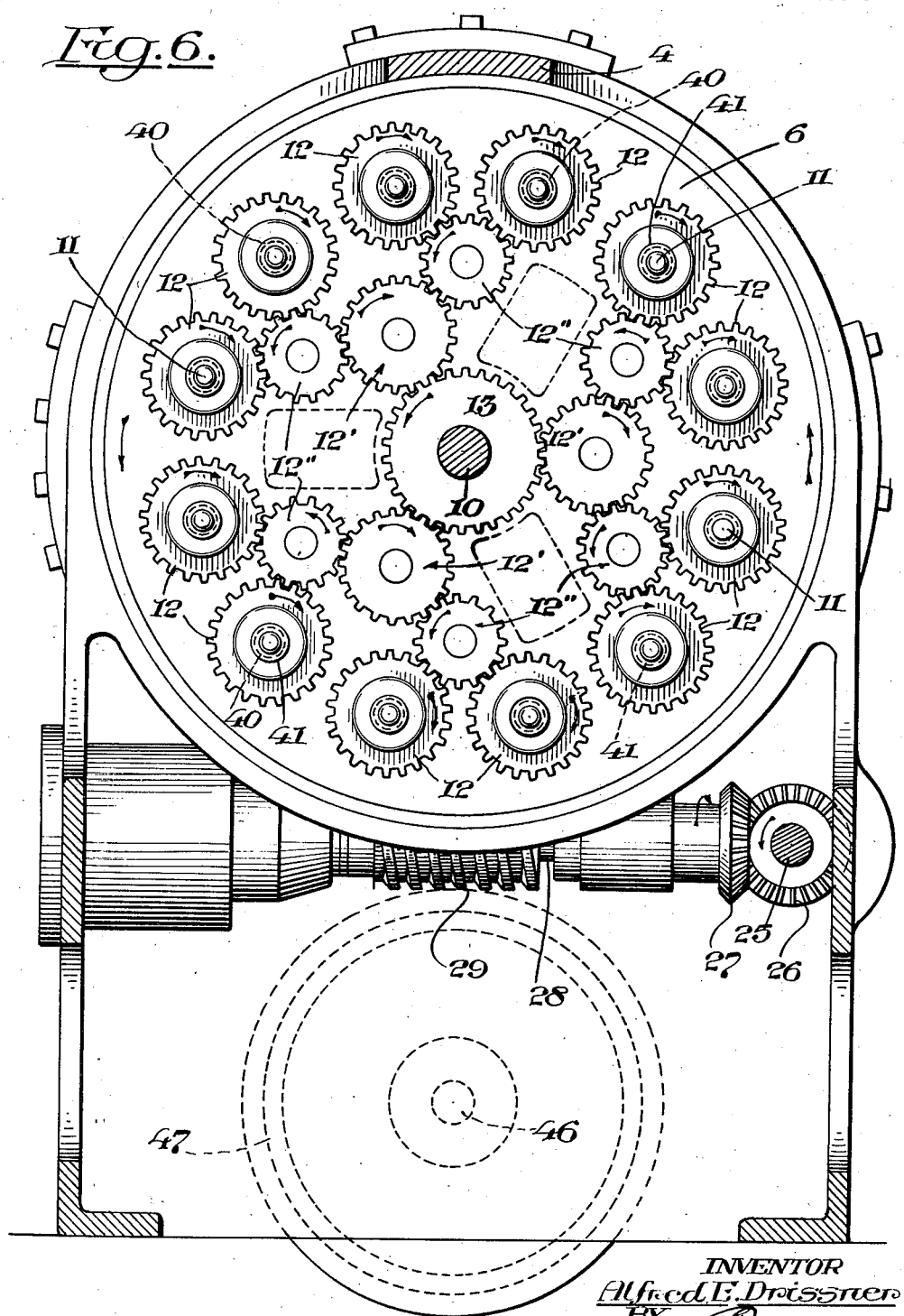

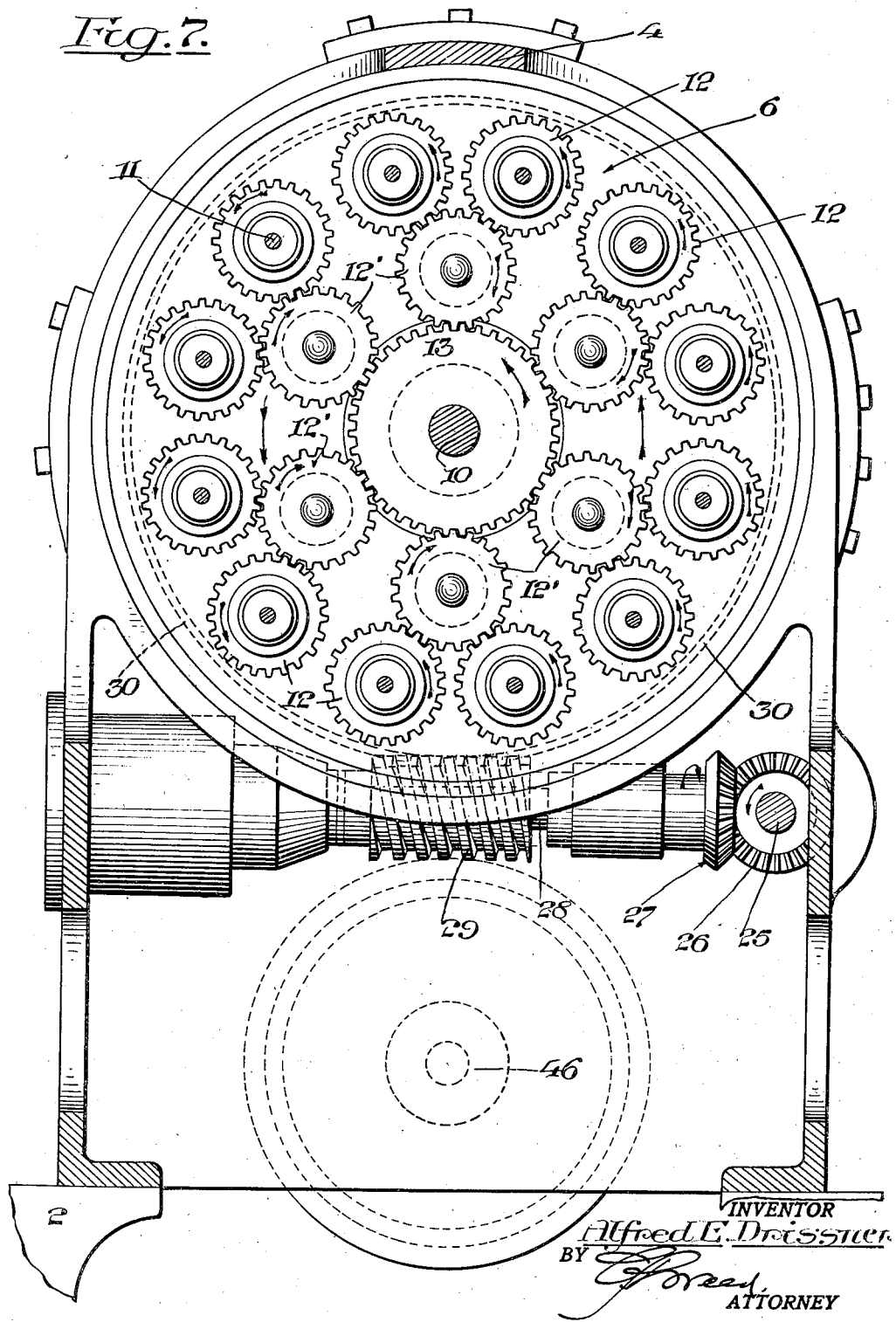

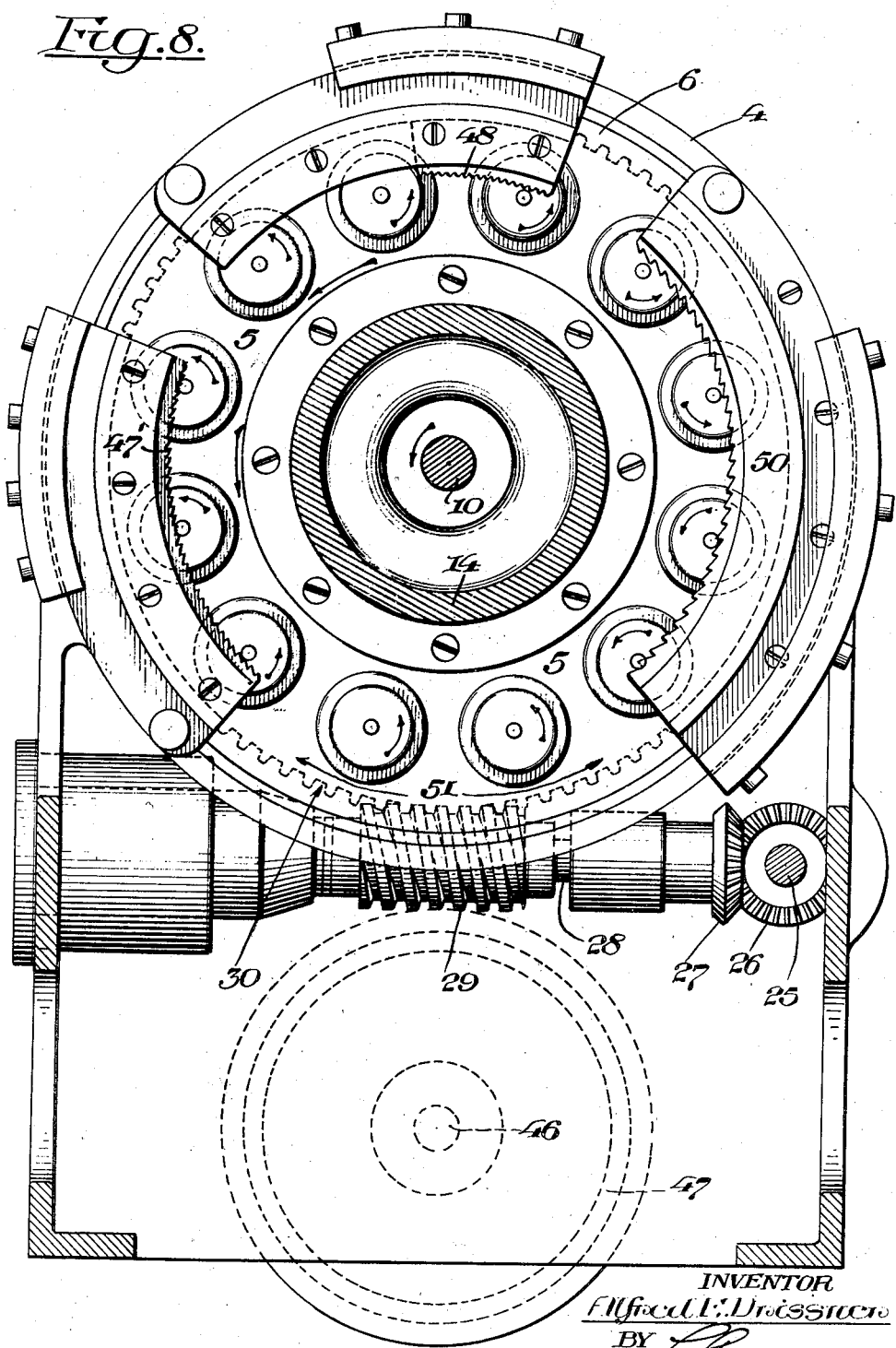

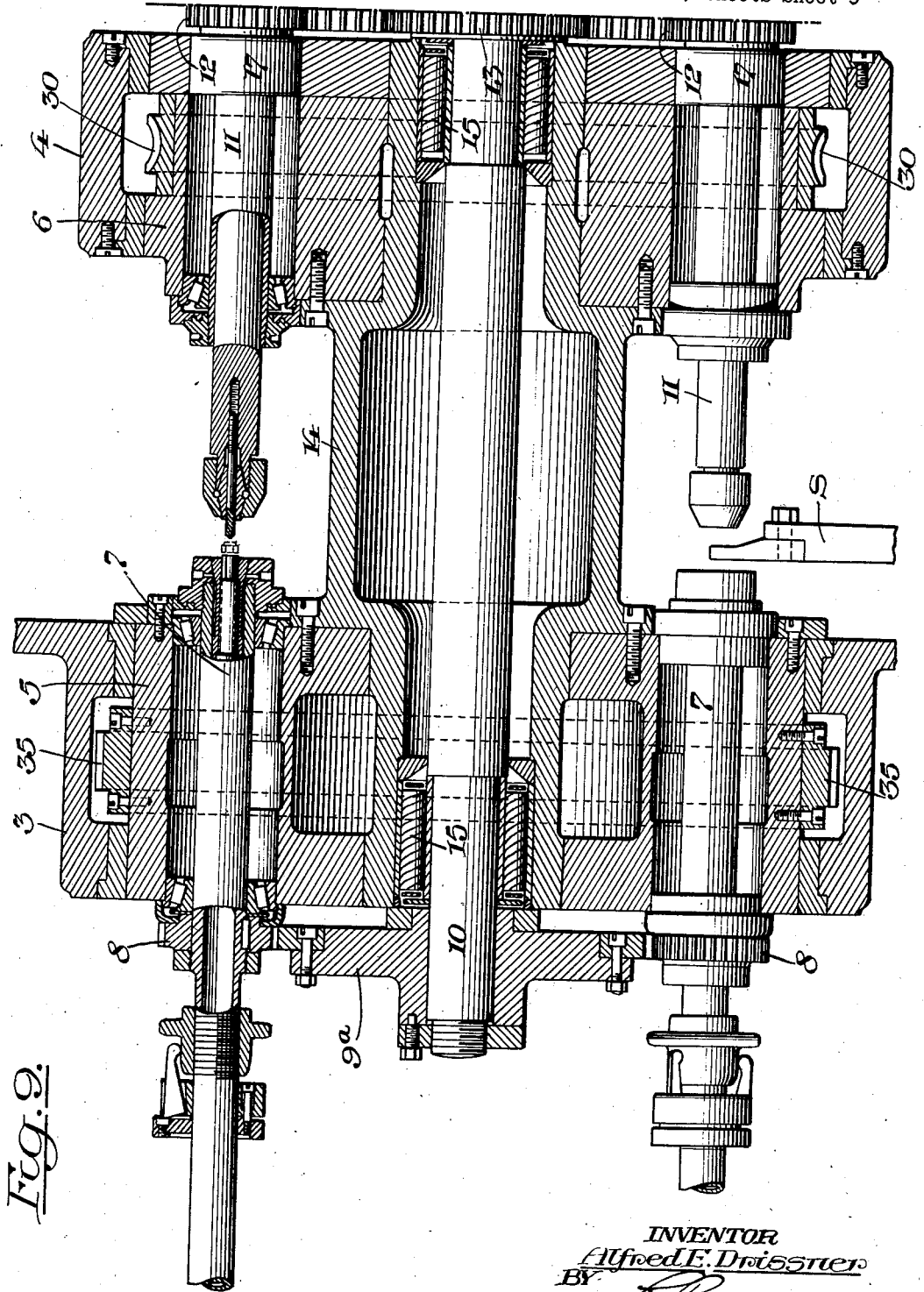

April 2, 1935.  A. E. DRISSNER  1,996,368
AUTOMATIC MULTIPLE SPINDLE MACHINE
Filed Jan. 26, 1933   15 Sheets-Sheet 10
Fig. 9ª
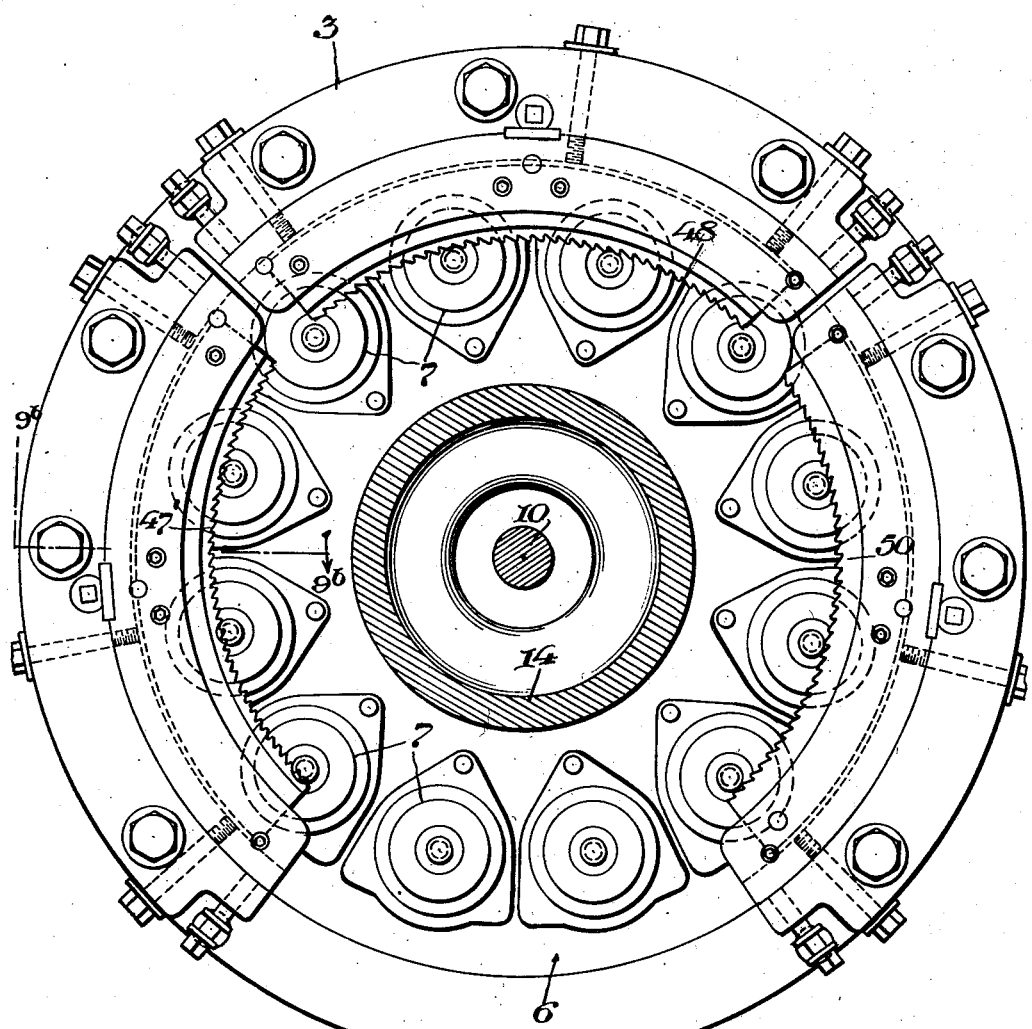
Fig. 9ᵇ
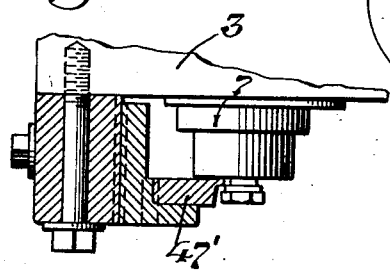
INVENTOR
Alfred E. Drissner
BY
ATTORNEY April 2, 1935.  A. E. DRISSNER  1,996,368
AUTOMATIC MULTIPLE SPINDLE MACHINE
Filed Jan. 26, 1933    15 Sheets-Sheet 11
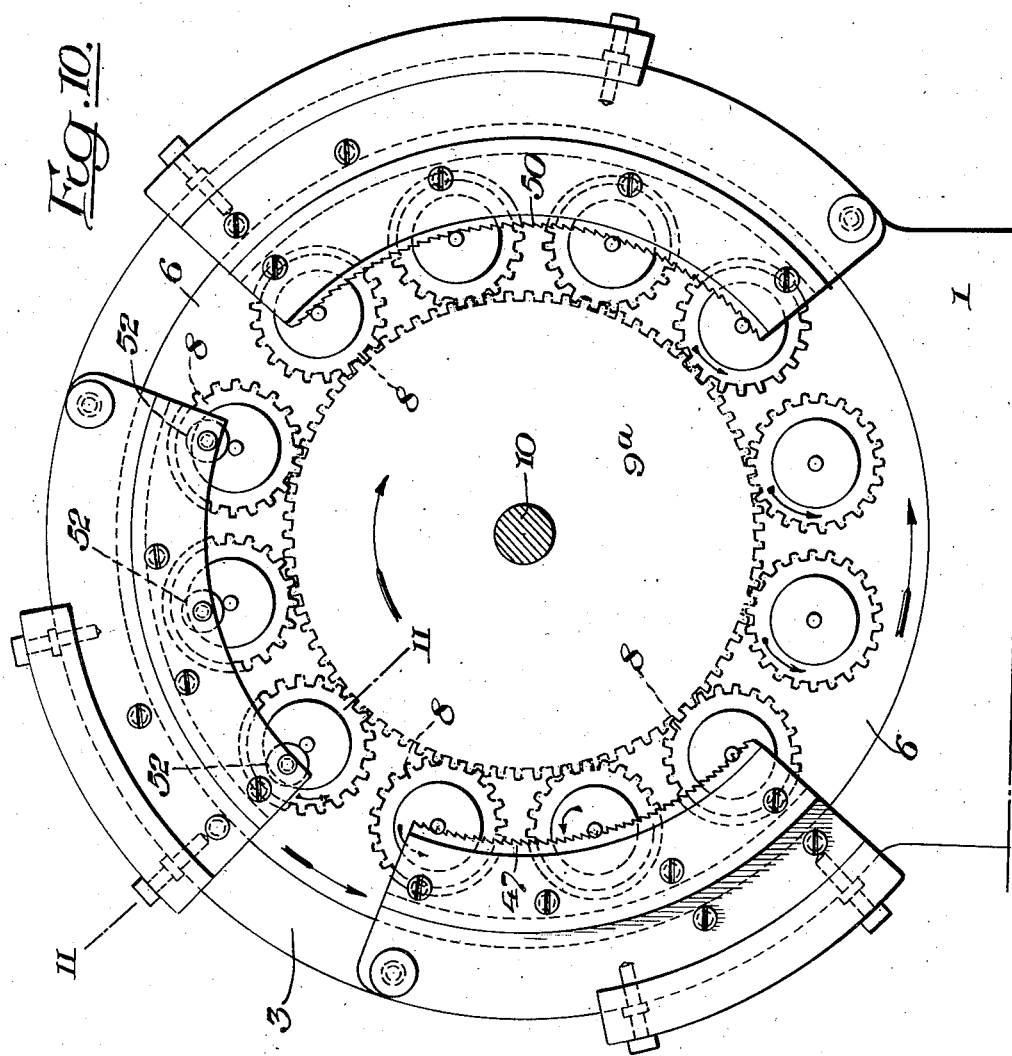
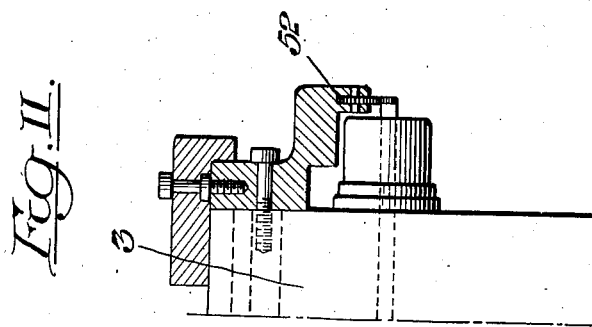
INVENTOR
Alfred E. Drissner
BY
ATTORNEY

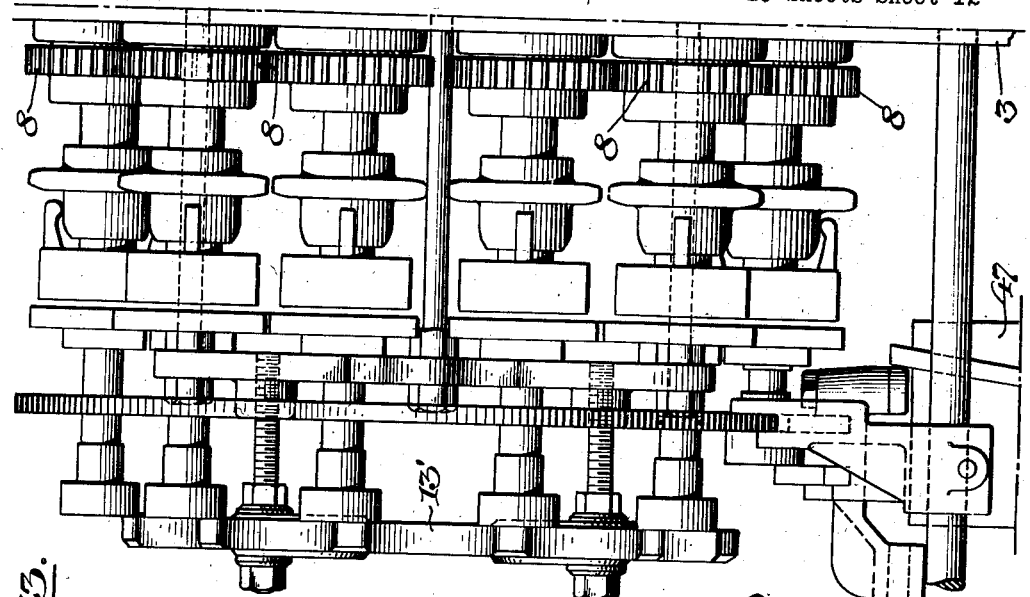
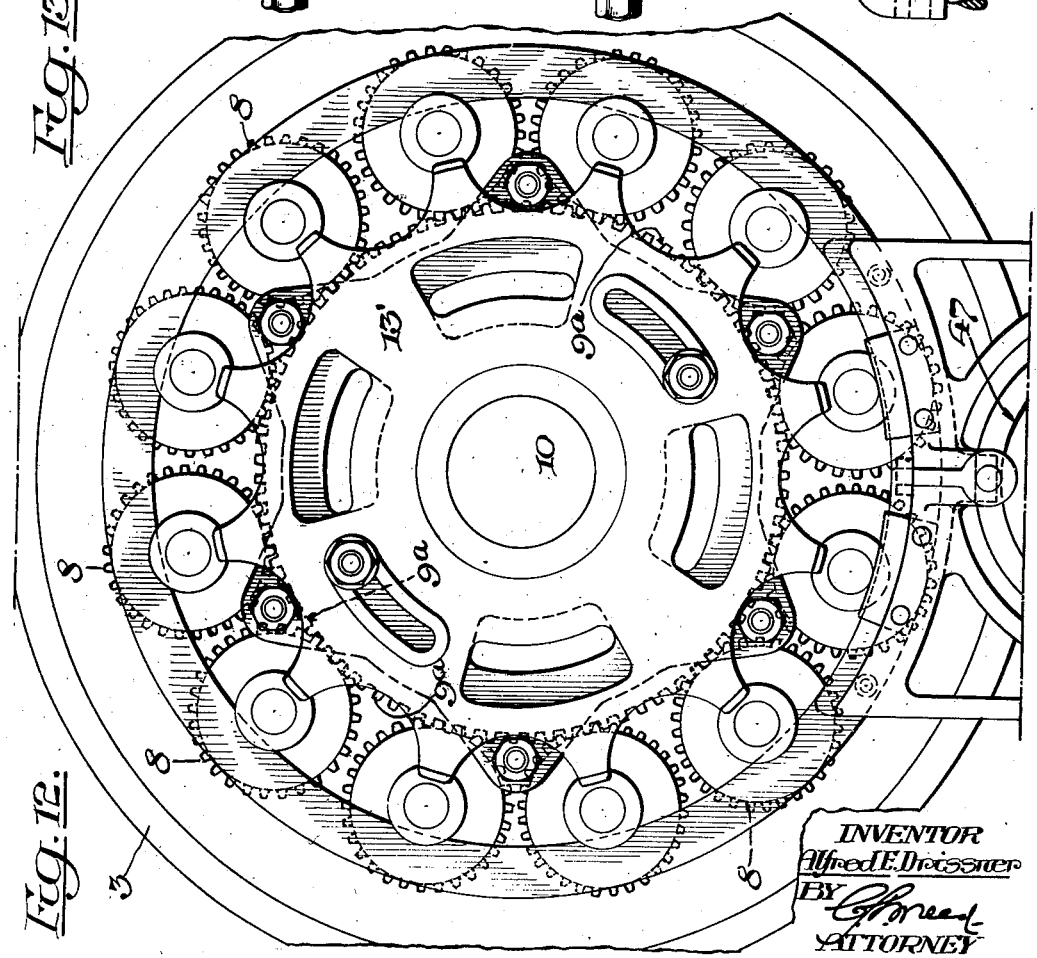

April 2, 1935.  A. E. DRISSNER  1,996,368
AUTOMATIC MULTIPLE SPINDLE MACHINE
Filed Jan. 26, 1933   15 Sheets-Sheet 13

INVENTOR
Alfred E. Drissner
BY
ATTORNEY

April 2, 1935.  A. E. DRISSNER  1,996,368
AUTOMATIC MULTIPLE SPINDLE MACHINE
Filed Jan. 26, 1933   15 Sheets-Sheet 14
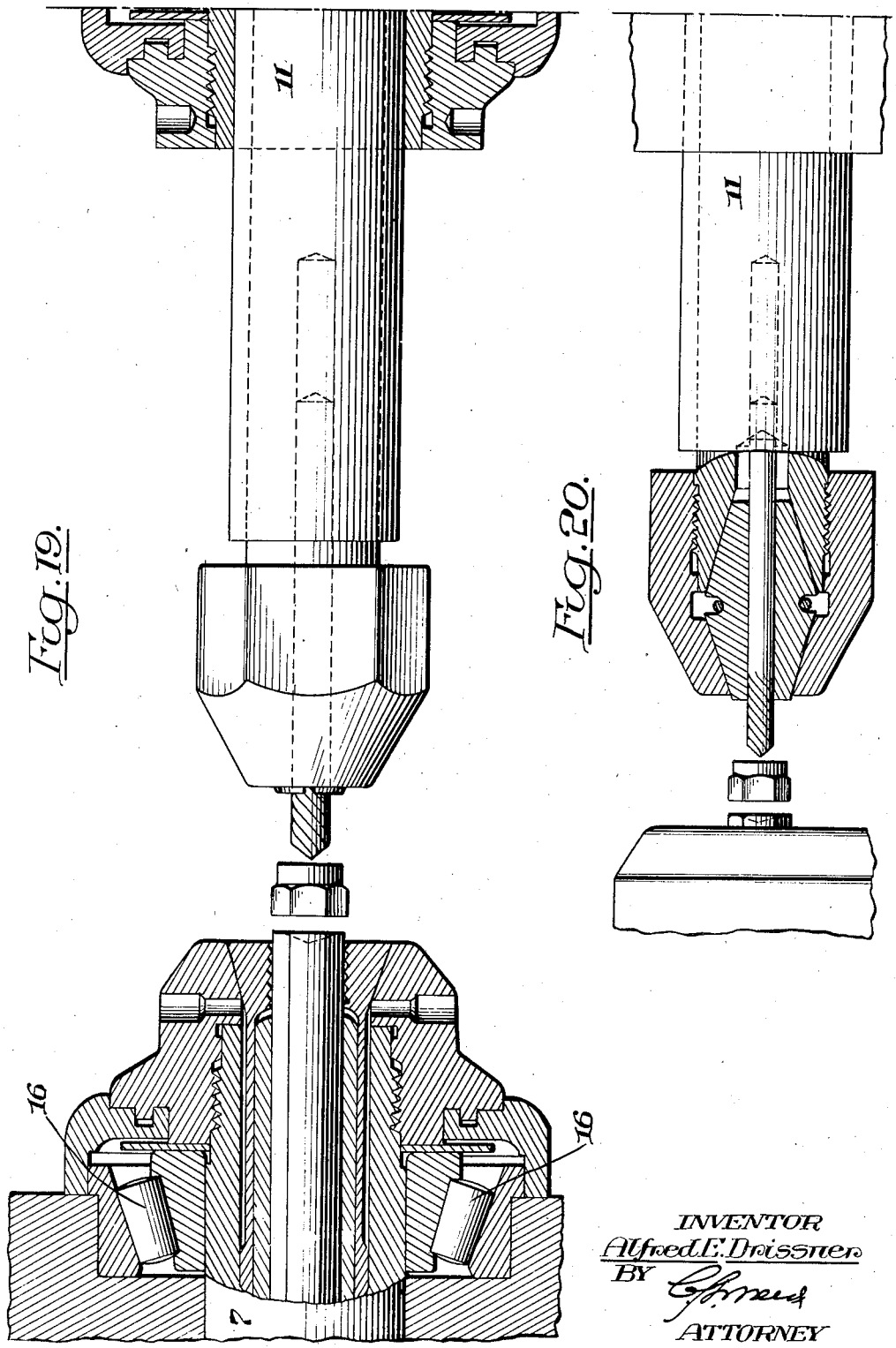
INVENTOR
Alfred E. Drissner
BY
ATTORNEY April 2, 1935.  A. E. DRISSNER  1,996,368
AUTOMATIC MULTIPLE SPINDLE MACHINE
Filed Jan. 26, 1933   15 Sheets-Sheet 15

INVENTOR
Alfred E. Drissner
BY
ATTORNEY

Patented Apr. 2, 1935

1,996,368

UNITED STATES PATENT OFFICE 1,996,368

AUTOMATIC MULTIPLE SPINDLE MACHINE

Alfred E. Drissner, Cleveland, Ohio, assignor to The National Acme Company, Cleveland, Ohio, a corporation of Ohio Application January 26, 1933, Serial No. 653,627

42 Claims. (Cl. 29—37)

This invention relates to metal working machines such as automatic multiple spindle screw machines, the object of the invention being to provide a new type of automatic multiple spindle screw machine in which there is no idle time of the work spindle carrier such as the usual lost time between the indexing thereof nor any loss of time due to the removal of the tools to permit indexing of the work spindle carrier and in which improvement a continued cutting action with the resultant large increase in production never heretofore accomplished in automatic multiple spindle machines is obtained.

Another object of the invention is the provision of an improved type of automatic multiple spindle screw machine in which a large number of rotating work spindles carried by an indexible work spindle carrier and a co-operating number of end working tools may be used.

A further object of the invention is the provision of a new type of automatic multiple spindle screw machine in which stationary side or cross working tools may be supported on the work spindle housing or adjacent thereto thus avoiding the necessity of providing means for shifting such side or cross working tools.

A further object of the invention is to provide a new type of automatic multiple spindle screw machine in which both the work spindle carrier and the tool spindle carrier can be continuously rotated in the same direction so that both may carry a larger number of spindles than heretofore possible, and in which the necessity of providing means for sliding or reciprocating the tool spindle carrier to and from the work spindle carrier is avoided.

A further object of the invention is the provision of an improved type of automatic multiple spindle screw machine in which a number of the operating parts heretofore necessary in multiple spindle screw machines are eliminated, whereby the cost of production is decreased and the machine very much simplified while, at the same time, an increased amount of production is obtained.

Heretofore, automatic multiple spindle screw machines have been provided with an indexible work spindle carrier intermittently indexed and having a series of rotatable work spindles, from four to six, and a sliding tool carrier shiftable toward and from the work spindle carrier. The construction of these machines has been such that it was not practicable to increase the number of the work spindles and, furthermore, the operation of the machine required considerable mechanism to operate the various movable parts such as the sliding tool carrier, the cross and top slides of these machines and the indexing and locking of the work spindle carrier, making the production very expensive aside from the constant wear and tear of the moving parts. The production of such a machine, due to the limited number of work spindles, was also limited but, in the present improved type of machine, there may be any reasonable number of work spindles, twelve, sixteen, or even more, according to the size of the machine, consequently increasing the productiveness of the machine while eliminating the necessity of having a sliding tool carrier and operating mechanism therefor, and also of operating mechanism for shifting the cross and top slides and other parts, thus materially reducing the cost of the machine and yet increasing very materially its output.

In the drawings accompanying and forming a part of this specification, Fig. 1 is a side elevation of this improved automatic multiple spindle screw machine.

Fig. 2 is a left hand end view thereof looking in the direction of the arrows.

Fig. 3 is a horizontal sectional view taken on the line 3—3 of Fig. 1.

Fig. 4 is a longitudinal sectional view of a major part of the machine shown in Fig. 1.

Fig. 5 is a perspective view of the work spindle carrier and its associated tool spindle carrier and the means for continuously indexing them.

Fig. 6 is a partly cross sectional view taken on the line 6—6 of Fig. 1, looking in the direction of the arrows.

Fig. 7 is a partly cross sectional view also taken on the line 6—6 of Fig. 1, looking in the direction of the arrows, this view showing but one set of intermediate gears between the driving shaft gear and the tool spindles while Fig. 6 shows two sets.

Fig. 8 is a partly sectional view taken on the line 8—8 of Fig. 1, looking in the direction of the arrows.

Fig. 9 is an enlarged longitudinal sectional view similar to Fig. 4, but illustrating the work spindles rotated directly from a large gear mounted on the driving shaft instead of through intermediate gears as in Fig. 2.

Fig. 9a is a view showing in detail the means for adjustably supporting the side working tools.

Fig. 9b is a detail sectional view taken on the line 9b—9b of Fig. 9a.

Fig. 10 is a view also taken substantially on the line 8—8 of Fig. 1, but illustrating the work spindles rotated by the large gear mounted on the shaft 10, as in Fig. 9, and also illustrating a set of rotary side tools stationarily supported.

Fig. 11 is a detail partly sectional view taken on the line 11—11 of Fig. 10.

Fig. 12 is a left hand end view of the machine and illustrates the position of the control disk for holding the feeding tubes in position during their rotary movement.

Fig. 13 is a side view thereof.

Figs. 19 and 20 are partly sectional views illustrating a work spindle and a tool spindle in their aligned positions.

Fig. 21 is a detail view of a portion of the stock rod feeding mechanism, and

Similar characters of reference indicate corresponding parts in the several views.

Figure 14:
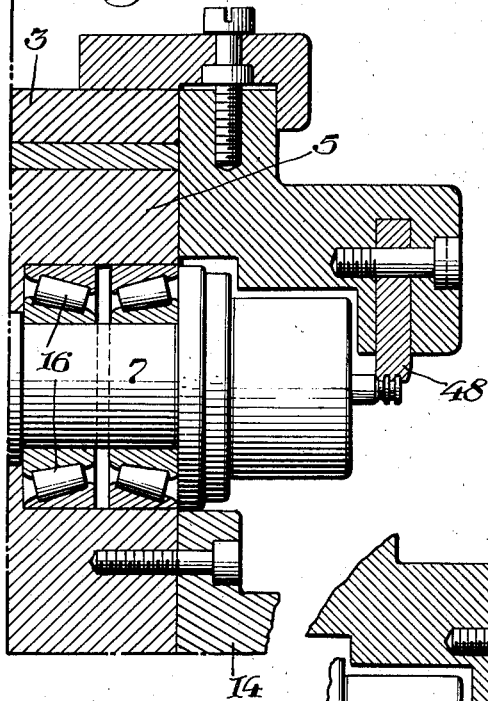
Figs. 14 and 15 illustrate a stationary forming tool mounted on the work spindle housing, Fig. 14 being a sectional view and Fig. 15 a face view thereof.
Figure 15:
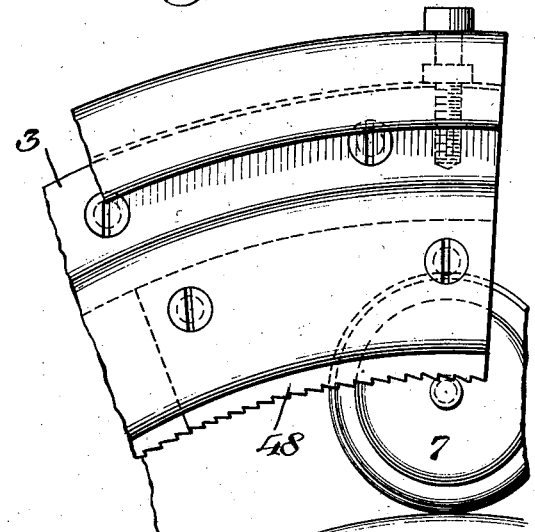
Figure 16:
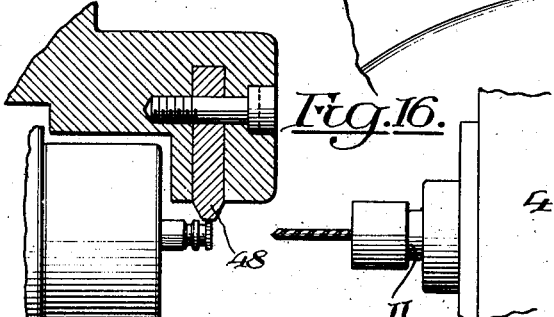
Fig. 16 is a partly sectional view illustrating a stationary knurling tool which may be supported on the work spindle housing.
Figure 17:
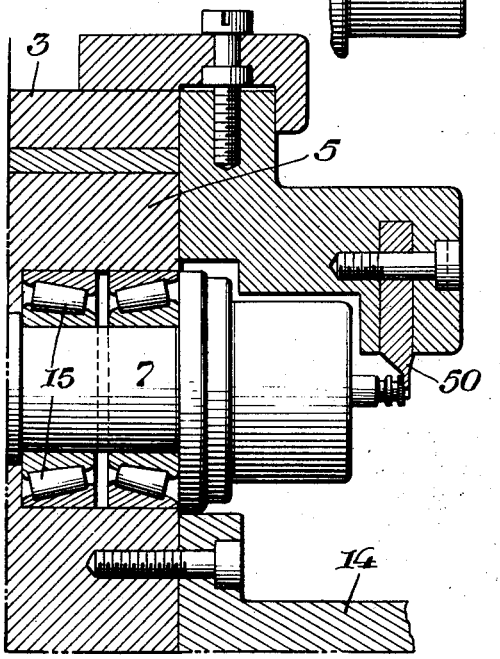
Figs. 17 and 18 illustrate a stationary cut-off tool which may be supported on the work spindle housing, Fig. 17 being a partly sectional view and Fig. 18 a face view thereof.
Figure 18:
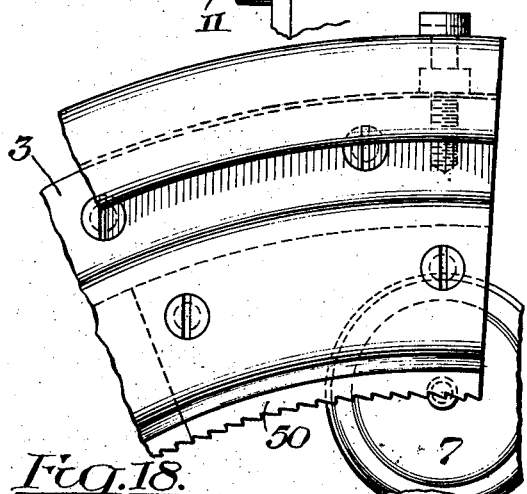

Before explaining in detail the present improvement and mode of operation thereof, I desire to have it understood that the invention is not limited to the details of construction and arrangement of parts illustrated in the accompanying drawings since the invention is capable of other embodiments, and that the phraseology which I employ is for the purpose of description and not of limitation.

This machine, which is primarily intended for the manufacture of drilled parts such as nuts, rings, battery nuts, etc., has a base 1 which may be provided with the usual oil pan 2. The base has upright frames or housings 3 and 4 for the work spindle carrier 5 and the tool spindle carrier 6, both of which, in this improved type of machine, are continuously rotated in the same direction by some suitable gearing such as spur or bevel gearing so that the necessity of providing means for intermittently indexing the work spindle carrier and locking it in its indexed position is entirely eliminated.

As the tool spindle carrier does not reciprocate toward and from the work spindle carrier as in the common form of multiple spindle screw machines, the necessity of providing means for reciprocating such tool spindle carrier is also obviated.

The present improved machine is shown provided with twelve rotary spindles carried by the work spindle carrier. These may be varied according to the size of the machine. These work spindles 7 which may be of the usual form for holding the stock rods are rotated at a predetermined speed by gears 8, one on each spindle, and all in mesh through intermediate gears 8' with a centrally located gear 9 mounted on the main driving shaft 10, see Fig. 2, or the spindles may be rotated without the intermediate gears and from a large gear 9a, see Figs. 9, 10 and 12.

The driving shaft 10 extends through both the tool spindle carrier and work spindle carrier. The tool spindles 11 carried by the tool carrier 6 are likewise rotated by similar gears 12, one on each tool spindle and likewise rotated by a gear 13 mounted on the main driving shaft 10 through a single set of intermediate gears 12', as in Fig. 7 or by two sets of intermediate gears 12' and 12'' as in Fig. 6, but in both forms, the work spindles will be rotated in a direction opposite to that of the drills, thus increasing the speed of the drilling operation and providing for high speed drilling.

When two sets of intermediate gears are used between the shaft gear and the gears of the tool spindles as in Fig. 6 then the work spindles are driven by using one set of intermediate gears as in Fig. 2, but when the work spindles are driven by a single large gear as in Figs. 9, 10 and 12, then the tool spindles are driven by using only one set of intermediate gears as in Fig. 7.

When the structure shown in Figs. 7, 9, 10 and 12 is used, a high spindle speed is obtained such as for brass work, etc., but when the form shown in Figs. 2 and 6 is used, a lower spindle speed is secured. Of course, it will be understood that by the mere disengagement of the driving shaft gear that rotates the tool spindle carrier, the tool spindles and, therefore, the drills or other end working cutting tools remain stationary while the work spindles rotate relative thereto.

The same stock rod feeding and chuck controlling mechanism common in standard automatic multiple spindle machines may be used in the present machine and, therefore, a description of this part of the machine is deemed unnecessary. The machine, however, is provided with an adjustable control disk 13', see Figs. 12 and 13, for engaging the feed tubes during their rotary movement. This disk is shiftable axially to permit the withdrawal of the feed tubes.

The work spindle carrier 5 and the tool spindle carrier 6 are supported on and fixed to a tubular sleeve or member 14, see Figs. 4 and 9, flanged over the opposed faces of the carriers and thus the two carriers are tied together for continuous rotation at the same speed in the same direction so that the work and tool spindles are always in perfect alignment.

Between the tubular sleeve 14 and the driving shaft 10 are located roller bearings 15, the work spindles and tool spindles also being mounted in suitable roller bearings 16 and 17. A motor may be used for driving the driving shaft 10 but in the present instance, it is driven by a belt pulley 18, the end of the shaft 10 being supported by a bracket 19 fixed to the tool carrier housing 4.

The machine is provided with a suitable stationary stop S, see Figs. 1 and 4.

By means of a system of gearing shown as bevel gearing comprising a bevel gear 20 mounted on the driving shaft 10, a meshing bevel gear 21 mounted on a transverse stub shaft 22, a bevel gear 23 mounted on this same transverse shaft and a bevel gear 24 mounted on a shaft 25, and meshing bevel gears 26 and 27, the former mounted on the shaft 25 and the latter on a cross shaft 28 carrying a worm 29 meshing with a worm gear 30 carried by the tool spindle carrier 6, the latter is rotated continuously at a predetermined speed.

The machine will usually be provided with the change gear mechanism 31, see Fig. 1, a pair of gears of which are mounted on the shaft 25 for varying the speed of this shaft 25, and similar change speed gearing 31' is provided for the main driving shaft 10, see Fig. 1.

By the same driving mechanism through the medium of a bevel gear 32 mounted on the shaft 25 and a meshing bevel gear 33 mounted on a cross shaft 34 and meshing with a worm gear 35 carried by the work spindle carrier, this carrier is also rotated in unison with the tool spindle carrier in the same direction and at the same speed, thus effectively preserving the alignment of the tool and work spindles and insuring accuracy of the work.

Thus it will be observed that, in the present machine, the tool spindle carrier continuously rotates but has no reciprocatory movement whatsoever and, therefore, means for reciprocating the tool carrier is unnecessary.

For feeding the tool spindles toward and from the stock or work in sequence and usually in sets, shown herein as set of three, a fixed cam 36 is provided in the rear of the tool spindles and through which the driving shaft 10 extends. This cam is fixed in a ring 37 carried by an upright frame member 38 of the framework of the machine, see Figs. 1 and 4. Between this cam and the tool spindles are located sliding roll carrying members 38' supported in a frame member 39. Suitable springs 40 are located between these members 38' and the gears 12 of the tool spindles for maintaining the members 38' in contact with the cam and these springs are mounted between collars 41 and 42 carried by extensions of the tool spindles so as to retract the spindles and thereby the end working tools or drills from the work at the proper time.

Thus, when the tool and work spindle carriers rotate, these members 38' slide through the action of the incline faced cam 36 and push the tool spindles toward the work so that the tools will cut and operate during approximately 300° of the circumference of the cam. The depth of the cut of the drills or other end working tools is controlled by the angle of the cam 36 and the feed of the cutting tools is controlled by the change speed gearing.

The driving shaft 25 extends through the rear end of the machine and is provided with a pulley 43, see Fig. 5, carrying a belt 44 extending to a pulley 45 mounted on a shaft 46 carrying a feeding cam drum 47. The cams on this drum are so arranged that when the work spindle carrier rotates one revolution, provided it has twelve spindles, this cam drum will rotate twelve times during that rotation of the carrier and will accomplish the opening and closing of the chucks and the feeding of the stock for the twelve spindles during that one rotation. The speed of this drum is changed according to the number of the work spindles applied to the work spindle carrier. The cam drum operates through suitable lever mechanism in which the levers A and B are located opposite to each other and the cams on the drum are so arranged that during one cycle of the cam drum the chuck will be opened through the medium of the lever B and maintained during the feeding operation of the stock, whereupon the lever A will close the chuck when the feeding of the stock is completed. Thereupon the lever B, by means of the cams on the cam drum will return to its original position so as to line up with the next rotating spindle.

The drum has three sets of chuck opening and closing cams and three sets of feeding cams so that when the cam drum makes one revolution, the stock rods have been fed through three of the spindles. In other words, at each revolution of the cam drum, three stock rods are fed through three of the spindles in readiness to be operated upon by three of the drills or other end working tools.

Heretofore, in automatic multiple spindle screw machines, suitable cross slides and top slides have been provided to carry forming and cut-off tools as well as other side working tools, and these slides, of course, required operating mechanism usually operated from a cam shaft for shifting them toward and from the work, thereby very materially complicating the machine as well as increasing the cost of production thereof and also shortening the life of the machine due to wear and tear on this operating mechanism.

In the present instance, however, these shiftable side working tools are eliminated and, in place thereof, stationary tools are provided, various forms of which may be used such as forming tools, knurling tools, cut-off tools, etc. These stationary cutting tools can be mounted along different sections of the work spindle carrier housing so that during the rotation of the work spindle carrier, the work spindles rotating at high speed will pass by the stationary cutting tools and thus form or shape the piece as desired. After passing the forming tools, the spindles will then be carried, for instance, to the knurling tools or to numbering or thread rolling devices and from there carried to a stationary cut-off blade made in the shape of a broach. These different tools are illustrated in sections, see, for instance, Fig. 8, 47' denoting the forming tool simultaneously coacting with three work spindles, 48 denoting a knurling tool likewise coacting with three of the work spindles and 50 denoting a cut-off tool which, in this instance, is shown coacting with four of the work spindles, see also Figs. 9 and 14 to 18.

When the work is cut off by the cutting tool 50, the cut-off pieces will drop into a chute not shown and thereupon the work spindles will pass through a gap between the cut-off tool and the forming tool, see 51, Fig. 8, which permits the feeding and chuck operating mechanism to perform their work and advance the stock rods into position to be operated upon and against a stationary stock stop S, see Figs. 1 and 4, whereupon the chucks will be closed before the work spindles reach the first stationary forming tool.

These stationary tools are bolted to the face of the housing of the work spindle carrier in the manner shown, for instance, in Figs. 8, 9a, 14 and 17 and are, as before stated, so arranged that they will co-operate simultaneously with several of the work spindles during their rotary movements with the rotating work spindle carrier and they are adjustable toward and from the center of the work spindles and also axially of the work spindles.

If desired, suitable rotating tools can be used supported by the work spindle housing, see Figs. 10 and 11, such as milling cutters, so that in this type of machine, either stationary tools or rotating tools supported by the housing may be used for the performance of the desired work and, therefore, the term "stationary" as used herein does not necessarily mean that these side working tools are stationary but that they are stationarily supported. For instance, the cut-off tool may be in the form of a rotating saw similar to a milling cutter and rotating at high speed to cut the piece off the bar stock.

The gap hereinbefore referred to corresponds with a similar gap on the cam 37 so that the drill spindles will be pushed toward the work for approximately 300° of the circumference of the cam and returned to a neutral position before the piece is cut off and this permits the finished part to drop freely through a chute to a container, the drill spindles remaining in their retracted position until the material is fed out to the proper length and chucked.

It will be understood that the stationary cutting tools can be readily changed to any shape or form desired to accomplish the necessary outside work on the piece according to the required shape or form thereof. The cutting tools are so formed that the work will operate against the cutting teeth and these cutting tools may be made with straight teeth for short work or with teeth at an angle for long work so that the cutting edge will gradually work over the surface of the work in a way similar to an angular shaving tool and thus, instead of taking the full width of the cut at one time, the cutting edge may be ground on an angle so as to shave or cut the piece gradually, one part of the cutter passing over the center of the work before the full width of the cutter passes over.

From the foregoing, it will be seen that in the present improved type of machine, several of the stock rods are fed and chucked simultaneously and during the rotation of the work and tool spindle carriers, three of these stock rods are being formed by the stationary forming tool and then these three formed pieces are rotated into position to be simultaneously knurled, for instance, and then rotated into position to be cut off so that during the rotation of the spindle carriers, several of the rods are being formed and during the formation of these rods, several other rods are being knurled and during the knurling of these rods, the finished portions of several other rods are being cut-off so that, in the present machine having twelve spindles, the work is proceeding on ten of these spindles at the same time and, of course, during the forming and knurling operation, the end working tools, such as the drills are drilling the work. Thus, instead of one piece being formed at a time and then subsequently operated upon as in the old type of multiple spindle screw machine, several stock rods, shown in the present instance, as three, are being operated upon, thereby very materially increasing the production and decreasing the cost of the finished work.

From the foregoing, it will be seen that a very much simplified form of automatic multiple spindle machine is provided since, as before stated, means for intermittently indexing or locking the work spindle carrier is done away with as is also the idle time of the work spindle carrier, and the means for reciprocating the tool spindle carrier is eliminated as well as all means for operating transverse cross slides and the slides themselves are eliminated, making it possible to manufacture the machine at much less cost than heretofore while increasing the production of the machine.

Figure 22:
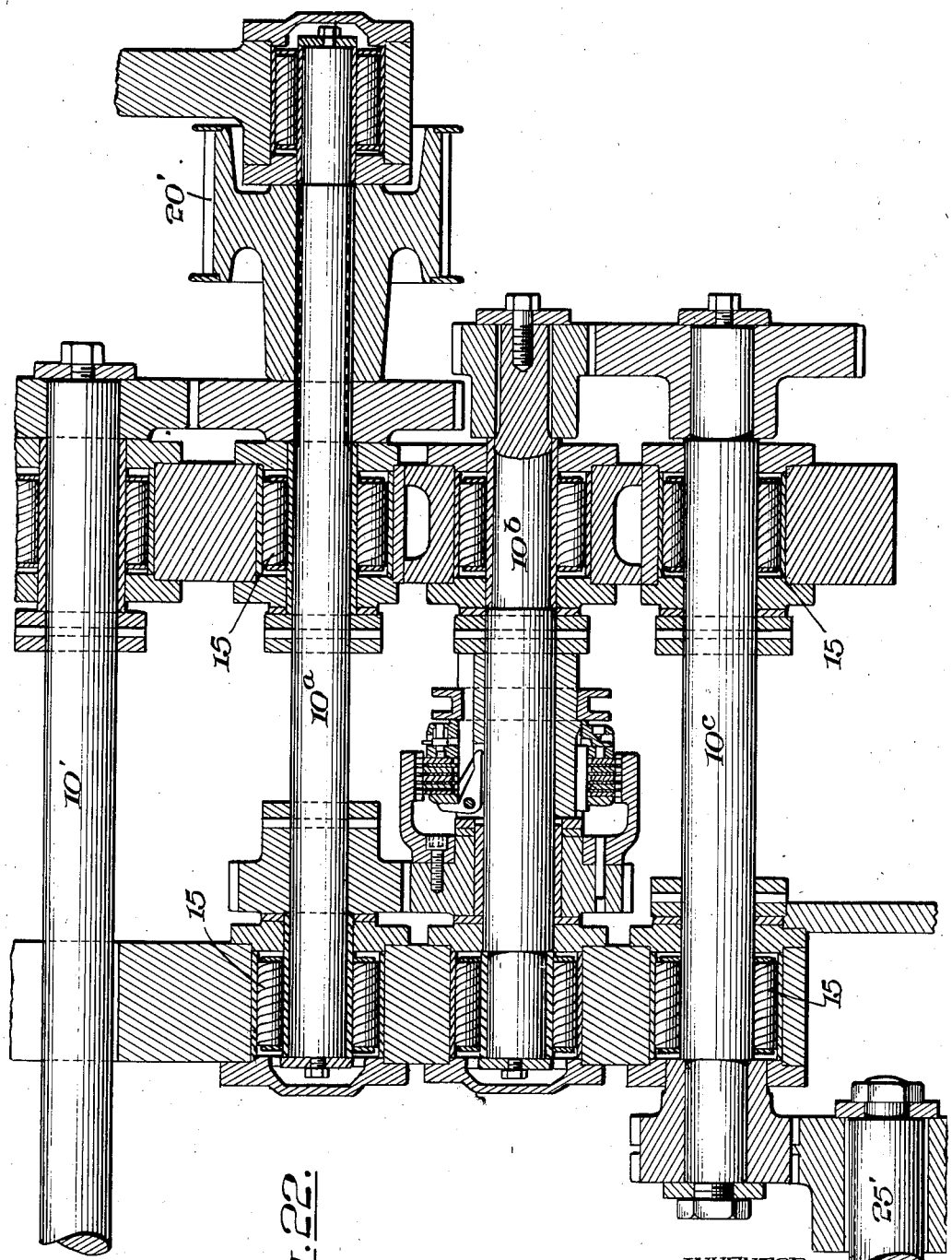
Fig. 22 is a longitudinal sectional view of a somewhat different driving mechanism for controlling the starting and stopping of the machine through the medium of twin disk clutch mechanism.

In place of the driving mechanism hereinbefore described comprising the bevel gearing, worm shafts, etc., a direct anti-friction bearing drive may be used, see Fig. 22. In this form of drive, a chain drive or belt pulley drive 20' is provided. This belt pulley 20' drives the shaft 10a which, in turn, through suitable gearing, drives the shaft 10' corresponding to the shaft 10, Fig. 1. The shaft 10a also, by suitable gearing, drives the shaft 10b which, in turn by suitable gearing, drives the shaft 10c and this, in turn, by suitable gearing, drives the shaft 25' which corresponds to the shaft 25 of Fig. 1. Intermediate the shafts 10a and 10b is suitable friction clutch mechanism to conveniently start and stop the feed of the machine.

In Figs. 10 and 11, rotating tools 52 stationarily supported are shown in the second section, such as a milling cutter, knurling tool, numbering tool or burnishing tool. In some instances, these stationarily supported side working tools may be located to work on the inside of the periphery of the spindles and in this case, they would be supported by the tubular member 14 which ties the two carriers together and bolted against the frame. In either case, it is very important that all the tools, either working internally or externally, stationary or rotating must be supported in a fixed position in relation to the rotating spindle carrier.

Of course, it will be understood that the tooling will depend upon the nature and shape of the work.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In an automatic multiple spindle screw machine, the combination of a pair of opposed spaced continuously rotating carriers, one a work spindle carrier and the other a tool spindle carrier, means for rotating them at the same speed and in the same direction, a series of hollow rotating work carrying spindles and tool spindles mounted respectively in said carriers, means for rotating one or both series thereof, and means for reciprocating one series thereof toward and from the other series.

2. In an automatic multiple spindle machine, the combination of a pair of spaced opposed continuously rotating carriers, one a work spindle carrier and the other a tool spindle carrier, means for rotating them at the same speed and in the same direction, each of said carriers having a series of rotating spindles, one series in alignment with the other and one series adapted to carry cutting tools, means for rotating them simultaneously, and means for imparting a relative feeding movement to the tool spindles and the stock rods carried by the work spindles.

3. In an automatic multiple spindle machine, the combination of a pair of opposed continuously rotating carriers, one a work spindle carrier and the other a tool spindle carrier, means for rotating them at the same speed and in the same direction, each of said carriers having a series of rotating spindles, means for rotating them simultaneously, means for reciprocating the tool spindles, and means for feeding stock rods through the work spindles during the rotation of the carriers.

4. In an automatic multiple spindle machine, the combination of a pair of opposed continuously rotating carriers, one a work spindle carrier and the other a tool spindle carrier, means for rotating them at the same speed and in the same direction, each of said carriers having a series of rotating spindles, means for rotating them simultaneously, means for reciprocating the tool spindles and including a cam, and means for feeding stock rods through the work spindles during the rotation of the carriers.

5. In an automatic multiple spindle machine, the combination of a pair of opposed continuously rotating carriers, one a work spindle carrier and the other a tool spindle carrier, means for rotating them at the same speed and in the same direction, the work spindle carrier having a large number of rotating work spindles, means for rotating said spindles, the tool spindle carrier having the same number of cooperating tool spindles, and means for feeding stock rods through the work spindles during the rotation of the carriers.

6. In an automatic multiple spindle machine, the combination of a bed, a pair of upright housings mounted thereon in spaced relation, a pair of opposed continuously rotating carriers, one a work spindle carrier and the other a tool spindle carrier located in said housings, means for simultaneously rotating them within said housings, a series of rotating work spindles and a corresponding series of tool spindles mounted respectively in said carriers, means for shifting one series toward and from the other, and means for rotating one or both series of spindles.

7. In an automatic multiple spindle machine, the combination of a bed, a pair of upright housings mounted thereon in spaced relation, a pair of opposed continuously rotating carriers, one a work spindle carrier and the other a tool spindle carrier located in said housings, means for simultaneously rotating them within said housings at the same speed and in the same direction, a series of rotating work spindles and a corresponding series of tool spindles mounted respectively in said carriers, means for shifting one series toward and from the other, and means for rotating one or both series of spindles.

8. In an automatic multiple spindle machine, the combination of a bed, a pair of upright housings mounted thereon in spaced relation, a pair of opposed continuously rotating carriers, one a work spindle carrier and the other a tool spindle carrier located in said housings, means for simultaneously rotating them within said housings, a series of rotating work spindles and a corresponding series of tool spindles mounted respectively in said carriers, means for shifting one series toward and from the other, means for rotating one or both series of spindles, and means for feeding stock rods through the work spindles and toward the tool spindles.

9. In an automatic multiple spindle machine, the combination of a pair of opposed continuously rotating carriers, one a work spindle carrier and the other a tool spindle carrier, means for rotating them at the same speed and in the same direction, the work spindle carrier having a large number of rotating work spindles, and means for rotating said spindles, the tool spindle carrier having the same number of cooperating tool spindles and the tool spindles being rotatable in opposite directions to the work spindles, thereby to increase the speed for high speed drilling.

10. In an automatic multiple spindle machine, the combination of a pair of opposed continuously rotating carriers, one a work spindle carrier and the other a tool spindle carrier, means for rotating them at the same speed and in the same direction, and one or more stationary tools located in juxtaposition to the rotary work spindle carrier and cooperating with the work during the rotation of the carrier.

11. In an automatic multiple spindle machine, the combination of a pair of opposed connected continuously rotating carriers, one a work spindle carrier and the other a tool spindle carrier, and means for rotating them at the same speed and in the same direction, and sets of permanently supported side working tools co-operating with the work spindle carriers.

12. In an automatic multiple spindle machine, the combination of a pair of opposed continuously rotating carriers, one a work spindle carrier and the other a tool spindle carrier, means for rotating them at the same speed and in the same direction, and a plurality of stationary side working tools located in juxtaposition to the work spindle carrier, one of different form than another and co-operating with the work during the rotation of the carrier.

13. In an automatic multiple spindle machine, the combination of a pair of opposed continuously rotating carriers, one a work spindle carrier and the other a tool spindle carrier, a tubular member supporting and tying said carriers together, a shaft extending through said tubular member, means connected with the shaft for continuously rotating the carriers at the same speed and in the same direction, a series of rotating work spindles carried by the work spindle carrier, and means for rotating them.

14. In an automatic multiple spindle machine, the combination of a pair of opposed continuously rotating carriers, one a work spindle carrier and the other a tool spindle carrier, a driving shaft extending through the carriers, means connected with the shaft for continuously rotating the carriers at the same speed and in the same direction, a series of rotating work spindles carried by the work spindle carrier, and means for rotating them.

15. In an automatic multiple spindle machine, the combination of a pair of opposed continuously rotating carriers, one a work spindle carrier and the other a tool spindle carrier, a driving shaft extending through the carriers, and means connected with the shaft for continuously rotating the carriers at the same speed and in the same direction, each of said carriers having a series of rotating spindles and means operated from said driving shaft for rotating said spindles.

16. In an automatic multiple spindle machine, the combination of a pair of opposed continuously rotating carriers, one a work spindle carrier and the other a tool spindle carrier, a driving shaft extending through the carriers, and means connected with the shaft for continuously rotating the carriers at the same speed and in the same direction, each of said carriers having a series of rotating spindles and means operated from said driving shaft for rotating said spindles, the operating means for the spindles of the work carrier rotating said spindles in a direction opposite to that of the tool spindles.

17. In an automatic multiple spindle machine, the combination of a pair of opposed continuously rotating spaced apart carriers having aligned axis, one a work spindle carrier and the other a tool spindle carrier, means for rotating them at the same speed and in the same direction, a series of rotary spindles carried by each of the carriers within the periphery thereof and also having aligned axes, one series adapted to carry cutting tools, means for rotating said spindles, and cam means for shifting the tool spindles toward the work during the rotation of the carriers.

18. In an automatic multiple spindle machine, the combination of a work spindle carrier and a tool spindle carrier having aligned axes and spaced apart and tied together for rotation in the same direction and at the same speed, a driving shaft extending through the carriers, a series of rotary spindles carried by each of the carriers within the periphery thereof and also having aligned axes, one series adapted to carry cutting tools, means operated by the driving shaft for rotating the spindles, means operated from said driving shaft for continuously rotating the carriers, and cam controlled means for shifting the tool spindles toward the work.

19. In an automatic multiple spindle machine, the combination of a work spindle carrier and a tool spindle carrier tied together for rotation in the same direction and at the same speed, a driving shaft extending through the carriers, a series of rotary spindles carried by each of the carriers, means operated by the driving shaft for rotating the spindles, means operated from said driving shaft for continuously rotating the carriers, cam controlled means for shifting the tool spindles toward the work, and means for retracting the tool spindles from the work.

20. In an automatic multiple spindle machine, the combination of a work spindle carrier and a tool spindle carrier tied together for rotation in the same direction and at the same speed, a driving shaft extending through the carriers, a series of rotary spindles carried by each of the carriers, means operated by the driving shaft for rotating the spindles, means operated from said driving shaft for continuously rotating the carriers, cam controlled means for shifting the tool spindles toward the work, and means for retracting the tool spindles from the work, the cam controlled means operative to feed sets of the tool spindles in sequence.

21. In an automatic multiple spindle machine, the combination of a work spindle carrier and a tool spindle carrier tied together for rotation in the same direction and at the same speed, a driving shaft extending through the carriers, a series of rotary spindles carried by each of the carriers, means operated by the driving shaft for rotating the spindles, means operated from said driving shaft for continuously rotating the carriers, cam controlled means for shifting the tool spindles toward the work, means for retracting the tool spindles from the work, the cam controlled means operative to feed sets of the tool spindles in sequence, and stationary side working tools located in juxtaposition to the work spindle carrier and operating in sequence upon sets of stock rods carried by the spindles.

22. In an automatic multiple spindle screw machine, the combination of a work spindle carrier and a tool spindle carrier tied together for continuous rotation in one direction, each of said carriers having a series of rotating spindles, a driving shaft passing through the carriers, means operated thereby for rotating the carriers, means operated thereby for rotating the spindles at different speeds, cam controlled means for feeding the spindles toward the work, means for retracting the spindles, a series of stationarily supported side working tools located in juxtaposition to the rotary work spindle carrier and operating in sequence upon the work as the same is rotated by the work spindle carrier into position to co-operate with said side tools, means for adjusting the side tools, and means for feeding and chucking the work relative to the spindles of the work spindle carrier and including cam controlled means operated from the driving shaft.

23. In an automatic multiple spindle machine, the combination of a pair of opposed continuously rotating carriers supported on a horizontal axis, one a work spindle carrier and the other a tool spindle carrier, means for rotating them at the same speed and in the same direction, a series of hollow rotatable work carrying spindles and tool carrying spindles mounted respectively in said carriers, means for rotating them, and means for feeding the stock rods through the hollow work spindles during the rotation of the carriers.

24. In an automatic multiple spindle machine, the combination of a pair of opposed continuously rotating carriers supported on a horizontal axis, one a work spindle carrier and the other a tool spindle carrier, means engaging said carriers exteriorly thereof for rotating them at the same speed and in the same direction, a series of hollow rotatable work carrying spindles and tool carrying spindles mounted respectively in said carriers, means for rotating them, and means for feeding the stock rods through the hollow work spindles during the rotation of the carriers.

25. In an automatic multiple spindle machine, the combination of a bed, a pair of upright housings mounted thereon in spaced relation, a pair of opposed continuously rotating carriers, one a work spindle carrier and the other a tool spindle carrier located in said housings, means for rotating them at the same speed and in the same direction and comprising a driving shaft extending axially through the carriers, means connected with the driving shaft for rotating the carriers, a series of rotating work spindles and tool spindles carried by said carriers respectively and circularly spaced outwardly from the driving shaft and inwardly from the housings, and means for reciprocating one series of spindles relatively to the other.

26. In an automatic multiple spindle screw machine, the combination of a pair of opposed spaced continuously rotating carriers, one a work spindle carrier and the other a tool spindle carrier, means for rotating them at the same speed and in the same direction, a series of hollow rotating work carrying spindles and tool spindles mounted respectively in said carriers, means for rotating said spindles in the same or opposite directions, and means for reciprocating one series thereof toward and from the other series.

27. In an automatic multiple spindle machine, the combination of a pair of opposed continuously rotating carriers, one a work spindle carrier and the other a tool spindle carrier, means for rotating them at the same speed and in the same direction, one or more stationary tools located in juxtaposition to the rotary work spindle carrier and cooperating with the work during the rotation of the carrier, a series of rotating work spindles carried by the work carrier, a series of tool spindles carried by the tool carrier, means for rotating one or both series thereof, and means for reciprocating one series thereof toward and from the other.

28. In an automatic multiple spindle screw machine, the combination of a pair of opposed spaced apart continuously rotating carriers having aligned axes, one a work spindle carrier and the other a tool spindle carrier, means for rotating them at the same speed and in the same direction, a series of rotary spindles carried by each of the carriers and within the periphery thereof and also having aligned axes, one series adapted to carry cutting tools, means for rotating one or both series thereof, and means for reciprocating one series toward and from the other series.

29. In an automatic multiple spindle machine, the combination of a pair of opposed continuously rotating carriers, one a work spindle carrier and the other a tool spindle carrier, means for rotating them at the same speed and in the same direction and comprising a driving shaft extending axially through the carriers, a means connected with the driving shaft and engaging the carriers exteriorly thereof for rotating them, a series of rotatable work spindles carried by the work spindle carrier and a series of tool spindles carried by the tool spindle carrier, and means also operated by said driving shaft for rotating said spindles.

30. In an automatic multiple spindle machine, the combination of a pair of opposed continuously rotating carriers supported on a horizontal axis, one a work spindle carrier and the other a tool spindle carrier, means for rotating them at the same speed and in the same direction, a series of hollow rotatable work carrying spindles and tool carrying spindles mounted respectively in said carriers, means for rotating them, and means for shifting the tool spindles toward the work and operative to feed sets of tool spindles in sequence.

31. In an automatic multiple spindle machine, the combination of a pair of opposed continuously rotating carriers supported on a horizontal axis, one a work spindle carrier and the other a tool spindle carrier, means engaging said carriers exteriorly thereof for rotating them at the same speed and in the same direction, a series of hollow rotatable work carrying spindles and tool carrying spindles mounted respectively in said carriers, means for rotating them, and means for shifting the tool spindles toward the work and operative to feed sets of tool spindles in sequence.

32. In an automatic multiple spindle machine, the combination of a pair of opposed continuously rotating carriers, one a work spindle carrier and the other a tool spindle carrier, means for rotating them at the same speed and in the same direction and comprising a driving shaft extending axially through the carriers, means connected with the driving shaft and engaging the carriers exteriorly thereof for rotating them, a series of rotatable work spindles carried by the work spindle carrier and a series of tool spindles carried by the tool spindle carrier, means also operated by said driving shaft for rotating said spindles, and means for shifting the tool spindles toward the work and operative to feed sets of tool spindles in sequence.

33. In an automatic multiple spindle machine, the combination of a pair of opposed continuously rotating carriers supported on a horizontal axis, one a work spindle carrier and the other a tool spindle carrier, means for rotating them at the same speed and in the same direction, a series of hollow rotatable work carrying spindles and tool carrying spindles mounted respectively in said carriers, means for rotating them, and one or more stationarily supported side working tools located in juxtaposition to the work spindle carrier and co-operating with the work during the rotation of the carrier.

34. In an automatic multiple spindle machine, the combination of a pair of opposed continuously rotating carriers supported on a horizontal axis, one a work spindle carrier and the other a tool spindle carrier, means engaging said carriers exteriorly thereof for rotating them at the same speed and in the same direction, a series of hollow rotatable work carrying spindles and tool carrying spindles mounted respectively in said carriers, means for rotating them, and one or more stationarily supported side working tools located in juxtaposition to the work spindle carrier and co-operating with the work during the rotation of the carrier.

35. In an automatic multiple spindle machine, the combination of a pair of opposed continuously rotating carriers, one a work spindle carrier and the other a tool spindle carrier, means for rotating them at the same speed and in the same direction and comprising a driving shaft extending axially through the carriers, means connected with the driving shaft and engaging the carriers exteriorly thereof for rotating them, a series of rotatable work spindles carried by the work spindle carrier and a series of tool spindles carried by the tool spindle carrier, means also operated by said driving shaft for rotating said spindles, and one or more stationarily supported side working tools located in juxtaposition to the work spindle carrier and co-operating with the work during the rotation of the work.

36. In an automatic multiple spindle machine, the combination of a pair of opposed continuously rotating carriers one a work spindle carrier and the other a tool spindle carrier, means for rotating them at the same speed and in the same direction, a series of work spindles and tool spindles carried respectively by said carriers, means for rotating them, and one or more stationarily supported tools located in juxtaposition to the rotary work spindle carrier and co-operating with the work during the rotation of the carrier.

37. In an automatic multiple spindle machine, the combination of a pair of opposed continuously rotating carriers, one a work spindle carrier and the other a tool spindle carrier, means for rotating them at the same speed and in the same direction, a series of work spindles and tool spindles carried respectively by said carriers, means for rotating them, and one or more stationarily supported tools located in juxtaposition to the rotary work spindle carrier and co-operating with the work during the rotation of the carrier, each of said tools constructed to co-operate with a series of work spindles.

38. In an automatic multiple spindle machine, the combination of a pair of opposed continuously rotating carriers, one a work spindle carrier and the other a tool spindle carrier, means for rotating them at the same speed and in the same direction, a series of work spindles and tool spindles carried respectively by said carriers, means for rotating them, and one or more stationarily supported tools located in juxtaposition to the rotary work spindle carrier and co-operating with the work during the rotation of the carrier, each of said tools constructed to co-operate with a series of work spindles and having a segmental formation.

39. In an automatic multiple spindle machine, the combination of a pair of opposed continuously rotating carriers, one a work spindle carrier and the other a tool spindle carrier, means for rotating them at the same speed and in the same direction, each carrying a series of rotating spindles, means for rotating the spindles, and a tool supporting means located in juxtaposition to the rotary work spindle carrier and carrying means adapted to co-operate with a series of work spindles.

40. In an automatic multiple spindle machine, the combination of a pair of opposed continuously rotating carriers, one a work spindle carrier and the other a tool spindle carrier, means for rotating them at the same speed and in the same direction, each carrying a series of rotating spindles, means for rotating the spindles, and a segmentally formed tool supporting means located in juxtaposition to the rotary work spindle carrier and carrying means adapted to co-operate with a series of work spindles.

41. In an automatic multiple spindle machine, the combination of a pair of opposed continuously rotating carriers, one a work spindle carrier and the other a tool spindle carrier, means for rotating them at the same speed and in the same direction, each of said carriers having a series of rotating spindles, means for rotating them simultaneously, means for feeding bars of stock through the work spindle carriers, and means for reciprocating the work spindles and tool spindles, one set relatively to the others.

42. In an automatic multiple spindle machine, the combination of a pair of opposed continuously rotating carriers, one a work spindle carrier and the other a tool spindle carrier, means for rotating them at the same speed and in the same direction, each of said carriers having a series of rotating spindles, means for rotating them simultaneously, means for feeding bars of stock through the work spindle carriers, means for reciprocating the work spindles and tool spindles, one set relatively to the others, and means stationarily supported in juxtaposition to the work spindles for operating on the sides of the work.

ALFRED E. DRISSNER.